Feb. 14, 1933.  H. Y. NORWOOD  1,897,326

THERMOMETER

Filed April 30, 1931

INVENTOR:
Harry Y. Norwood
BY
Alfred Burger
ATTORNEY

Patented Feb. 14, 1933

1,897,326

UNITED STATES PATENT OFFICE

HARRY Y. NORWOOD, OF WEST RUSH, NEW YORK, ASSIGNOR TO TAYLOR INSTRUMENT COMPANIES, OF ROCHESTER, NEW YORK, A CORPORATION OF NEW YORK

THERMOMETER

Application filed April 30, 1931. Serial No. 533,877.

This invention relates to mercury thermometers and more in particular to thermometers of the type used in industrial establishments.

It is the object of the invention to provide a thermometer which can be easily read both by reflected light and by transmitted light.

The characteristics of the invention and its advantages will be fully understood in connection with the accompanying drawing which forms part of the specification.

In the drawing

Figure 1:
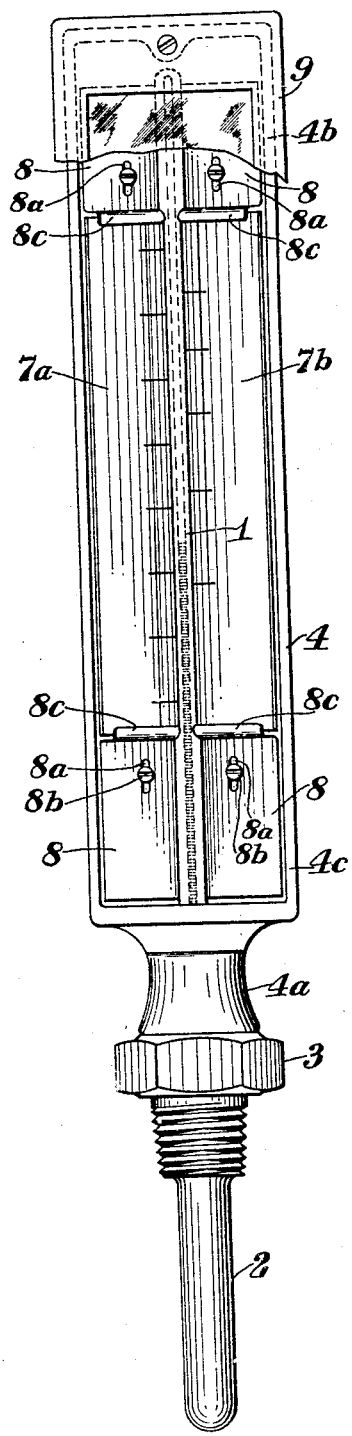
Fig. 1 is a front view of a thermometer embodying the invention.
Figure 2:
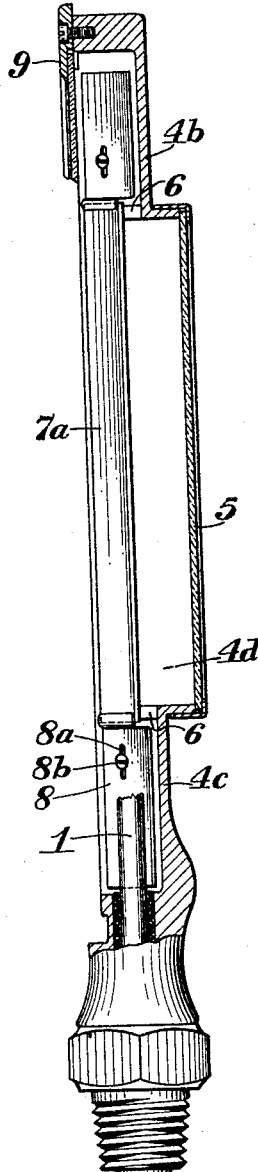
Fig. 2 is a longitudinal section through so much of the thermometer shown in Fig. 1 as constitutes part of the invention.
Figure 3:
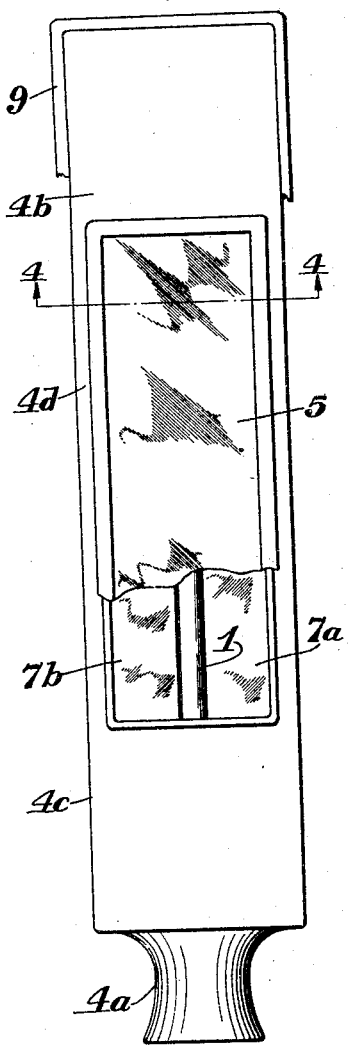
Fig. 3 is a rear view of the thermometer shown in Fig. 1, a part being omitted.

Having reference to the drawing, 1 is the thermometer stem, the bulb of which is seated in the usual way in the bulb chamber or well 2. The mechanical detail including the chamber 2, wrench-head 3, bottom 4a of the casing 4, etc. do not form any part of the invention and may be assumed to correspond to a usual form of construction.

Figure 4:
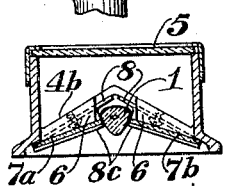
Fig. 4 is a cross section on line 4—4, Fig. 3.

The casing 4 includes an upper section 4b and a lower section 4c generally V-shaped in cross section, as shown in Fig. 4, and a central section 4d which has an opening to the rear, covered by a translucent screen 5.

The thermometer stem 1 lies in or slightly in front of the crotch of the V of sections 4b and 4c. At the lower end of section 4b and at the upper end of section 4c are provided ledges 6 increasing in height toward the center. These ledges which do not extend to the center but leave a gap to accommodate the stem 1, are provided to support milk glass scale portions 7a and 7b which are held in position by clasps 8. Clasps 8 are mounted for sliding adjustment on the surfaces of the sections 4b and 4c by means of slots 8a and screws 8b. By this arrangement the scales may be accurately adjusted relatively to the stem. The gripping portions 8c of the clasps overlie the ends of the scale glasses and the inner edges of the portions 8c form abutments for the stem 1 so that the latter is centered and confined against lateral and forward movement. The inner edges of the scale glasses may be adjusted to lie close against the stem whereby the scale divisions are brought into close reading relation to the mercury column of the thermometer.

The front of the casing is covered by the usual form of glass cover 9.

While the thermometer described may be equally well read by reflected and by transmitted light, it is especially adapted for reading by transmitted light. Light transmitted through the translucent screen passes through both the stem and the milk-glass scales and thus makes the mercury column stand out against the division lines of the scales with greater clearness than could be obtained by reflected light.

I claim:

1. A thermometer comprising, in combination with a mercury tube, a support including an upper portion and a lower portion for receiving the opposite ends of the tube and a middle portion having an opening toward the rear, a translucent screen in said opening, and translucent scale members supported on said upper and lower portions and substantially coextensive with said middle portion.

2. A thermometer comprising, in combination with a mercury tube, a support including an upper portion and a lower portion substantially V-shaped in cross-section for receiving the opposite ends of the tube and a middle portion having an opening toward the rear, a translucent screen in said opening and translucent scale members supported on said upper and lower portions and substantially coextensive with said middle portion, said scale members abutting against the tube on opposite sides thereof.

3. A thermometer comprising, in combination with a mercury tube, a support including an upper portion and a lower portion substantially V-shaped in cross-section for receiving the opposite ends of the tube and a middle portion having an opening toward the rear, a translucent screen in said opening, translucent scale members disposed on opposite sides of the tube and means on the said upper and lower portions for adjustably holding the scale members, including means abutting against the tube on opposite sides thereof to hold the latter against lateral and against forward movement.

4. A thermometer comprising, in combination with a mercury tube, a support including an upper portion and a lower portion substantially V-shaped in cross-section for receiving the opposite ends of the tube and a middle portion having an opening toward the rear, a translucent screen in said opening, translucent scale members disposed on opposite sides of the tube, ledges on the said upper and lower portions for supporting the scale members and clasps adjustably mounted on the said upper and lower portions for holding the scale members upon said ledges and means on the clasps for abutting with the tube to hold the latter against lateral and against forward movement.

5. A thermometer comprising, in combination with a mercury tube, a support including an upper portion and a lower portion substantially V-shaped in cross-section for receiving the opposite ends of the tube and a middle portion having an opening toward the rear, a translucent screen in said opening, ledges on the said upper and lower portions on opposite sides of the tube, translucent scale members on said ledges and clasps adjustably mounted on the said upper and lower portions for holding the scale members upon the ledges and means on the clasps for abutting with the tube to hold the latter against lateral and against forward movement, the said ledges increasing in height toward the tube and the scale members abutting against the tube.

In testimony whereof I affix my signature.

HARRY Y. NORWOOD.